March 15, 1927.
H. J. PAULEY
POULTRY FEEDER AND EXERCISER
Filed April 1, 1926
1,620,686
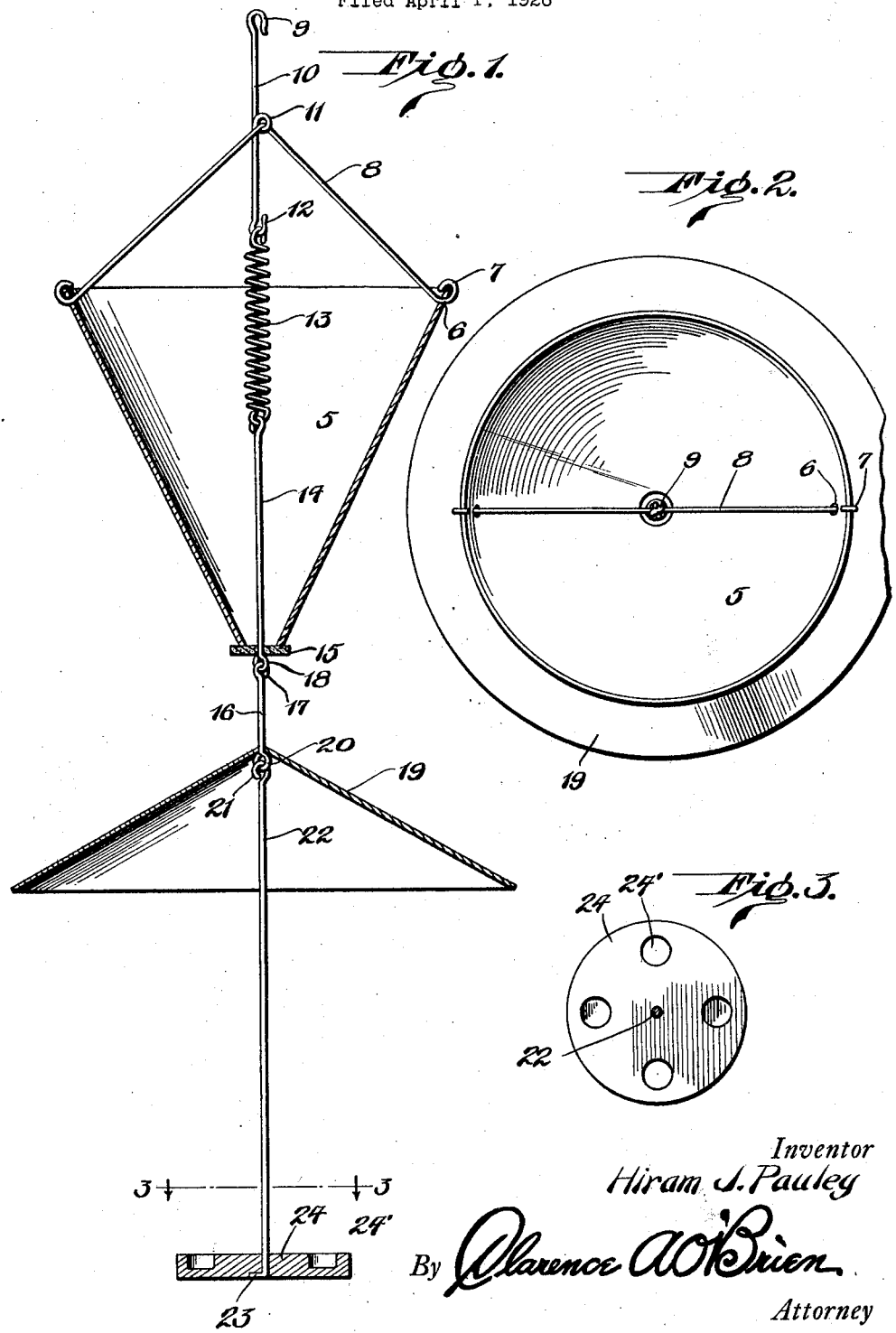
Inventor
Hiram J. Pauley
By Clarence A. O'Brien
Attorney Patented Mar. 15, 1927.

1,620,686

UNITED STATES PATENT OFFICE.

HIRAM J. PAULEY, OF STREATOR, ILLINOIS.

POULTRY FEEDER AND EXERCISER.

Application filed April 1, 1926. Serial No. 99,009.

The present invention relates to improvements in poultry feeders and exercisers, and has for its principal object to provide a device of this nature which is exceedingly simple in its construction, reliable in its operation, efficient, inexpensive to manufacture, strong and durable, not likely to easily become out of order, and otherwise well adapted to the purpose for which it is designed.

Another important object of the invention is to provide in a device of this nature a combination whereby the supported valve also supports the deflector so that the feed may be scattered for a considerable distance.

With the above and numerous other objects in view as will appear as the description proceeds, the invention resides in certain novel features of construction, and in the combination and arrangement of parts as will be hereinafter more fully described and claimed.

In the drawing:—

Figure 1 is a vertical longitudinal section through the device embodying the features of my invention, Fig. 2 is a top plan view thereof, and Fig. 3 is a detail transverse horizontal section taken substantially on the line 3—3 of Fig. 1 looking downwardly.

Referring to the drawing in detail, it will be seen that 5 designates a frusto-conical shaped hopper having openings 6 adjacent the larger upper end thereof for receiving the curved ends 7 of an inverted V-shaped rod 8. A hook 9 is formed on the upper end of a rod 10 which is bent inaermediate its ends to form an eye 11 for receiving the apex of the inverted V-shaped rod 8, and a hook 12 is formed on the lower end thereof.

A helical spring 13 depends from the hook 12. A valve rod 14 is engaged on the lower end of the spring and extends through the lower and small open end of the hopper 5. A lever disk valve 15 is mounted on the lower end of the valve rod 14 for closing the smaller or lower open end of the hopper. The spring 13 is tensioned to normally maintain the valve 15 closed.

A link 16 is engaged with the lower end of the valve rod 14 and depends therefrom having an eye 17 at its upper end engaging an eye 18 at the lower end of the valve rod. The lower end of the link 16 pierces the apex of a cone-shaped distributor or deflector 19 and terminates in an eye 20 which engages an eye 21 on the upper end of a supporting rod 22 which depends downwardly and has its lower end offset as at 23. This lower end of the supporting rod 22 pierces a central opening provided in a plate 24 while the offset end 23 engages in a depression provided in the lower surface of the plate.

Compartments 25 are formed in the upper surface of the plate 24 for receiving bait. The entire apparatus as thus described is swung from the hook 9. The chickens peck at the bait in the compartment 25, thereby causing the spring 13 to stretch and release the valve 15 from the hopper 5, so that food therein will fall thru the lower end of the hopper onto the deflector or distributor 19. As the spring contracts, the distributor will be moved upwardly, assisting in throwing the food a distance from the device.

It will be apparent from the above description that I have provided an exceedingly simple device for distributing food to chickens affording them a certain amount of exercise. The device is capable of being manufactured at a very low cost and the parts thereof are capable of easy and ready assembly and disassembly.

The present embodiment of the invention has been disclosed in detail merely by way of example, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

In combination, an inverted cone-shaped hopper having the lower end thereof open, said hopper being provided with openings adjacent its upper end, a V-shaped rod inverted and having its ends piercing the openings at the upper end of the hopper, a second rod bent intermediate its end to provide an eye for receiving the apex of the inverted V-shaped rod, the ends of the second rod terminating in hooks, a spring engaged with one hook, a valve rod engaged with the spring, a valve on the valve rod closeable normally by the spring over the lower open end of the hopper, a link engaged with the valve rod, a cone-shaped distributor on the link, a supporting rod engaged with the link and depending downwardly therefrom, and a bait holder on the lower end of the supporting rod.

In testimony whereof I affix my signature.

HIRAM J. PAULEY.